(No Model.)

J. F. OLDFATHER & B. F. GRANDSTAFF.
GATE.

No. 339,928. Patented Apr. 13, 1886.

WITNESSES
Villette Anderson.
Grace M. Craig.

INVENTORS
J. F. Oldfather.
B. F. Grandstaff,
by Anderson & Smith
their ATTORNEYS.

UNITED STATES PATENT OFFICE.

JOHN FRANKLIN OLDFATHER AND BENJAMIN FRANKLIN GRANDSTAFF, OF BUNKER HILL, INDIANA, ASSIGNORS TO JOHN G. GRANDSTAFF AND BENJAMIN F. GRANDSTAFF, OF SAME PLACE.

GATE.

SPECIFICATION forming part of Letters Patent No. 339,928, dated April 13, 1886.

Application filed November 20, 1884. Renewed February 4, 1886. Serial No. 190,846. (No model.)

*To all whom it may concern:*

Be it known that we, JOHN FRANKLIN OLDFATHER and BENJAMIN FRANKLIN GRANDSTAFF, citizens of the United States, residing at Bunker Hill, in the county of Miami and State of Indiana, have invented certain new and useful Improvements in Gates; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
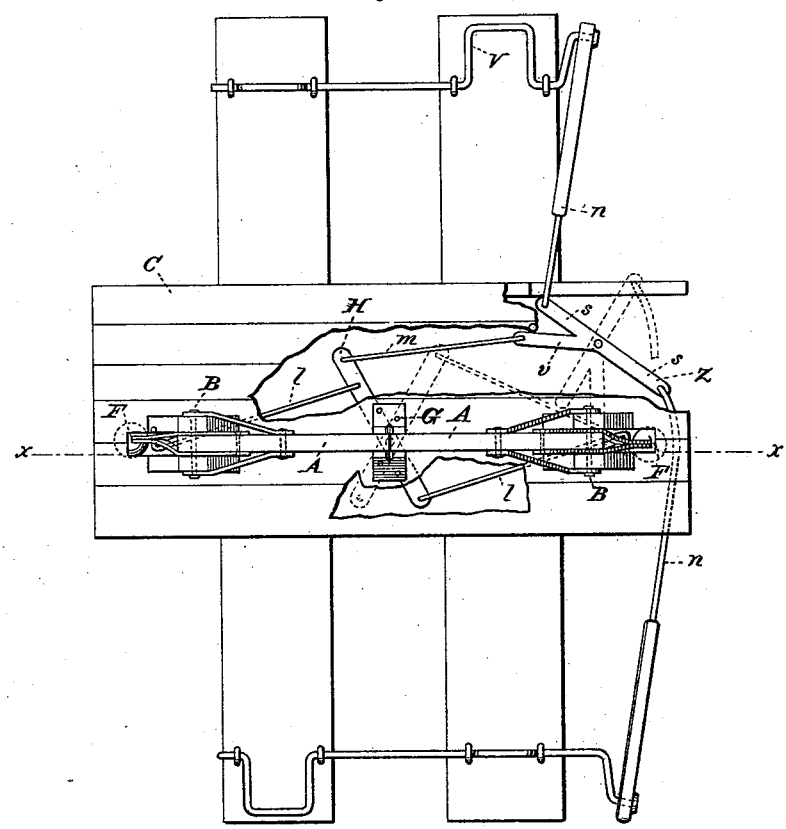
Figure 2:
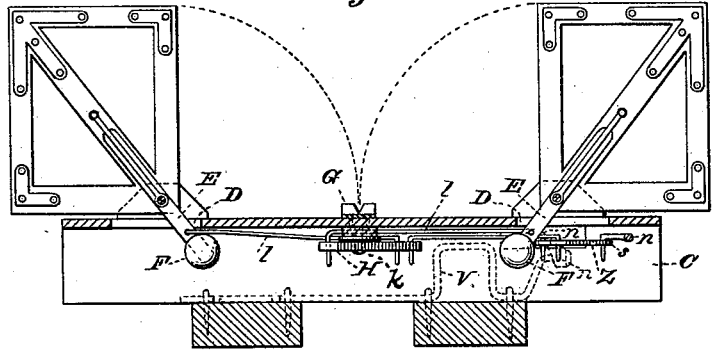

Figure 1 of the drawings is a representation of this invention, and is a top view, part of the box being broken away. Fig. 2 is a vertical section through the box, taken on the broken line $x$ $x$ (shown in Fig. 1,) and shows a front view of the gate with the machinery for working it.

This invention has relation to automatic gates pivoted to rise and fall in the vertical plane; and it consists in the construction and novel arrangement of devices, as hereinafter set forth, and pointed out in the appended claim.

In the accompanying drawings the letters A A indicate the right and left gate-sections, which are respectively pivoted in the bearings B, located at the sides of the roadway, and upon a boxing, C, which is placed in position across the roadway, so as to be in line therewith or to rise slightly therefrom. In the top of this boxing are provided slots D, which accommodate the lever-arms E, which are attached to the lower outer corners of the gate-sections and extend obliquely downward and outward therefrom when the gate-sections are in horizontal position. These lever-arms are provided with counterbalancing weights F, which are designed to facilitate the movements of the gate-sections, both in opening and closing.

G represents a casting, which is secured to the top of the boxing and serves to receive the lower corners of the meeting edges of the gate-sections when closed, thereby holding them in position and preventing them from being casually injured by transverse pressure. In the boxing is provided a lever-bar, H, pivoted at $k$, and having pivoted to the ends of its arms the connecting-rods $l$, to the outer ends of which the weight-arms E of the sections are attached. The general direction of the lever-bar H is in the length of the roadway, but it vibrates therefrom during its movements in operating the gate-sections.

The lever-bar H is provided with a connecting-rod, $m$, which extends outward and is connected to the oblique arm $v$ of the triple-armed lever Z, the other arms, $s$ $s$, of which are respectively connected by rods $n$ to the road-cranks V, said rods $n$ extending along the roadway.

The oblique arm $v$ of the triple arm Z extends somewhat inward, and when the gate-sections are closed its direction is transverse to the roadway, its line of prolongation extending outside of the point of connection of the rod $m$ to the lever-bar H, thus forming an automatic lock, holding the gate-sections down when closed. When the bail-crank is turned, the triple-arm lever is operated, turning the oblique arm, to loosen the automatic lock and to effect the consequent rise of the gate-sections.

We are aware that it is not new to form a gate in two vertically-moving sections, having a weighted bar connected therewith and provided with levers for operating the same, and therefore do not claim such devices, broadly.

Having described this invention, what we claim, and desire to secure by Letters Patent, is—

The combination, with the pivoted gate-sections and the road-cranks, of the lever-bar H, centrally pivoted in the road-boxing, the connecting-rods $l$, the triple-armed lever Z, pivoted near one end of said boxing, and the rods M and N connecting the arms of the triple lever with the central lever, H, and the road-cranks, respectively, as set forth.

In testimony whereof we affix our signatures in presence of two witnesses.

JOHN FRANKLIN OLDFATHER.
BENJAMIN FRANKLIN GRANDSTAFF.

Witnesses:
HENRY C. MOSELEY,
JOHN H. SHIVELY.